(12) United States Patent
Adler

(10) Patent No.: US 8,779,681 B2
(45) Date of Patent: Jul. 15, 2014

(54) MULTIMODE COLOR TUNABLE LIGHT SOURCE

(75) Inventor: Helmar Adler, Danvers, MA (US)

(73) Assignee: Osram Sylvania Inc., Danvers, MA (US)

(*) Notice: Subject to any disclaimer, the term of this patent is extended or adjusted under 35 U.S.C. 154(b) by 283 days.

(21) Appl. No.: 13/198,854

(22) Filed: Aug. 5, 2011

(65) Prior Publication Data

US 2012/0306381 A1    Dec. 6, 2012

Related U.S. Application Data

(63) Continuation-in-part of application No. 13/152,872, filed on Jun. 3, 2011.

(51) Int. Cl.
*G05F 1/00*    (2006.01)

(52) U.S. Cl.
USPC .......................................... 315/291

(58) Field of Classification Search
USPC ......... 315/112, 117, 149, 150, 158, 159, 291, 315/307
See application file for complete search history.

(56) References Cited

U.S. PATENT DOCUMENTS

| 4,539,625 | A | 9/1985 | Bornstein et al. | |
| 7,845,823 | B2 | 12/2010 | Mueller et al. | |
| 2005/0083293 | A1* | 4/2005 | Dixon | 345/102 |
| 2007/0091433 | A1* | 4/2007 | Garner et al. | 359/459 |
| 2009/0213041 | A1* | 8/2009 | Unger et al. | 345/52 |
| 2010/0148677 | A1* | 6/2010 | Melanson | 315/154 |
| 2010/0308737 | A1* | 12/2010 | Hilgers | 315/152 |
| 2011/0128725 | A1* | 6/2011 | Shew | 362/183 |

OTHER PUBLICATIONS

X Zhang, T Muneer, J Kubie, A design guide for performance assessment of solar light-pipes, Lighting Res. Technol. 34, 2 (2002) pp. 149-169.
Rikard Kuller et al., The impact of light and colour on psychological mood: a cross-cultural study of indoor work enviroments, Ergonomics, vol. 49, No. 14, Nov. 15, 2006, pp. 1496-1507.
Cardiff University, Dome simulates outdoors indoors, Professional Engineering.
P Sansoni, F Francini, D Fontani, L Mercatelli and D Jafrancesco, Indoor illumination by solar light collectors, Lighting Res. Technol. 2008; 40: pp. 323-332.

* cited by examiner

*Primary Examiner* — Minh D A
(74) *Attorney, Agent, or Firm* — Andrew Martin

(57) ABSTRACT

Described herein are ambient lighting devices, methods, and systems that utilize at least one multimode artificial ambient light source, a control unit, and a remote image sensor. The control unit couples to at least one artificial ambient light source and is configured to output at least one control signal to the at least one artificial ambient light source. The at least one multimode artificial ambient light source is configured to output light of varying color and color temperature in response to said at least one control signal. The remote image sensor couples to the at least one control unit and is configured to detect at least one color and intensity characteristic and output an output signal to the at least one control unit, based on said color and intensity characteristic detected.

20 Claims, 10 Drawing Sheets

US 8,779,681 B2

MULTIMODE COLOR TUNABLE LIGHT SOURCE

CROSS-REFERENCE TO RELATED APPLICATIONS

This application claims benefit and priority to U.S. patent application Ser. No. 13/152,872, MULTIMODE COLOR TUNABLE LIGHT SOURCE AND DAYLIGHTING SYSTEM, filed on Jun. 3, 2011, the entire disclosure of which is incorporated herein by reference.

FIELD

The present disclosure relates to daylighting or backlighting systems and methods that utilize a multimode color tuneable light source.

DETAILED DESCRIPTION

As used herein, the term "color" is used interchangeably with the term "spectrum." However, the term, "color" generally is used to refer to a property of radiation that is perceivable by an observer (though this usage is not intended to limit the scope of this term). Accordingly, the term "different colors" implies two different spectra with different wavelength components and/or bandwidths. In addition, "color" may be used to refer to white and non-white light.

For the purpose of this disclosure, the term "color temperature" refers to a particular color content or shade (reddish, bluish, etc.) of white light. The color temperature of a radiation sample is conventionally characterized according to the temperature in degrees Kelvin (K) of a black body radiator that radiates essentially the same spectrum as the radiation under examination. Daylight typically has a color temperature ranging from about 700K to over 10,000K, with lower color temperature corresponding to light having a more significant red component, and higher temperature corresponding to light having a more significant blue component. For reference, early morning light can exhibit a color temperature around 3,000K, whereas overcast skies can exhibit a color temperature of around 10,000K.

Reference will now be made in detail to exemplary embodiments of the disclosure, examples of which are illustrated in the accompanying drawings. Wherever possible, the same reference numbers will be used throughout the drawings to refer to the same or like parts.

The use and provision of daylight (daylighting) is becoming of increasing concern to architects and building engineers. Daylight can enhance the appearance of interior spaces, and can provide building occupants with social and psychological benefits. In addition, daylight can be used as a substitute or supplement to artificial lighting, which may reduce the overall energy usage of a building and impart substantial savings to building owners/occupants.

Traditionally, windows have been used as the primary mechanism for admitting daylight to the interior of a building. While windows can admit a great deal of light into an interior space, their usefulness for daylighting is limited by several factors. For example, windows can cause substantial solar heating of building interior spaces, particularly when used in large numbers. This can cause discomfort to building occupants, and may increase the load on air conditioning systems used to control the temperature of interior spaces in the building. Further, windows may not enable natural light to penetrate to all interior spaces of a building, particularly those interior spaces that are remote from the exterior walls of the building.

As a result, research has investigated other methods and devices for providing natural light to interior spaces. One product of resulting from such research is the so-called "solar tube."

Figure 1:
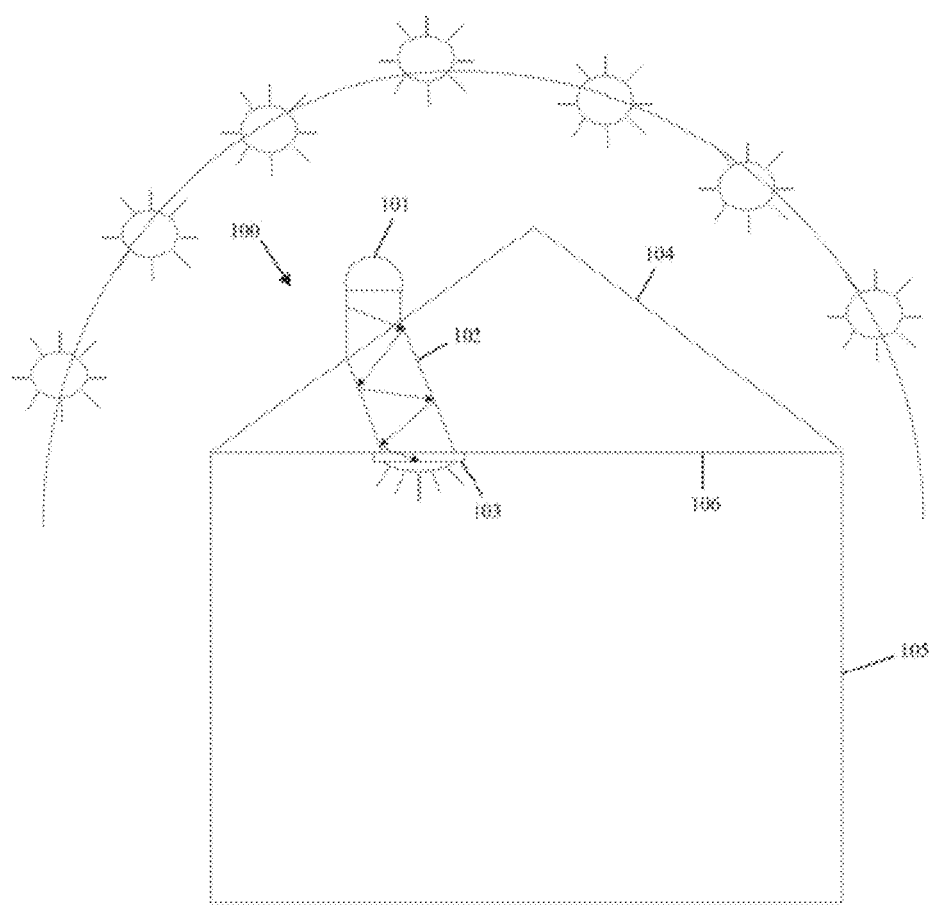
FIG. 1 depicts a lighting system according to the prior art.

FIG. 1 illustrates the structure of one type of solar tube, as installed in a building. As shown, solar tube 100 includes a dome 101, an optical conduit 102, and a diffuser 103. When installed, dome 101 is flush or above the roofline of a building 105, and serves to capture and redirect daylight (e.g., from the sun and/or the sky) into the optical conduit 102. The optical conduit 102 has one or more highly reflective interior surfaces (not labeled). As a result, captured daylight reflects one or multiple times off the interior surface(s) of the optical conduit, and is ultimately delivered to the diffuser 103.

While solar tubes such as the one depicted in FIG. 1 are capable of bringing significant daylight to the interior spaces of a building, they are not without limitations. Indeed, factors such as the position of the sun, the weather, and the clarity and diffuse radiance of the sky all impact the utility of solar tube. Many of these factors change over the course of a day, which means that the efficiency, light quality, and illumination capability of a solar tube changes dynamically. By way of example, solar-tubes such as the one depicted in FIG. 1 are generally ineffective for night-time illumination of the interior spaces of a building. Moreover, solar-tubes are often insufficient by themselves to illuminate darker areas.

One mechanism for addressing these limitations is to provide a combined lighting system, wherein one or more solar-tubes are utilized in conjunction with artificial lighting, such as incandescent or fluorescent lamps. The artificial lighting supplements the natural light provided by the solar-tube(s), and provides a mechanism for evening illumination. Such combined lighting systems can be operated with drivers that react to light intensity and change the intensity (brightness) of the artificial light sources, e.g., as a function of location in the building and the time of day.

While the addition of an artificial light source addresses some of the issues attendant to the use of solar-tubes for interior illumination, they result in the mixing of natural and artificial light from different sources, namely a solar-tube and a nearby fixture. Because artificial light sources typically have a single color and color temperature that is different from the color and color temperature of natural light, the combination of artificial light provided by such light sources with the natural light provided by a solar-tube can result in a perceptible and undesirable color difference. This color difference may be exacerbated during parts of the day, as the color temperature and intensity of the natural light provided by the solar-tube changes dynamically, e.g., with the position of the sun.

Because typical combined lighting systems utilize artificial lighting that has a fixed color and color temperature, such systems are generally incapable of addressing the aforementioned color difference, even if they are equipped with drivers that adjust the intensity of the artificial lighting. Moreover, such systems do not provide the capability to override the color and/or temperature of the natural light provided by a solar-tube when undesirable conditions exist, to supplement the spectrum and/or color of light provided by the solar-tube, and/or simulate desirable lighting conditions (e.g., producing a "sunny day" interior lighting profile, even when it is raining outside the building).

Accordingly, one aspect of the present disclosure relates to lighting systems that combine a source of natural light, such as a solar tube, with at least one artificial light source that is capable of producing light of varying color and/or color temperature.

Figure 2A:
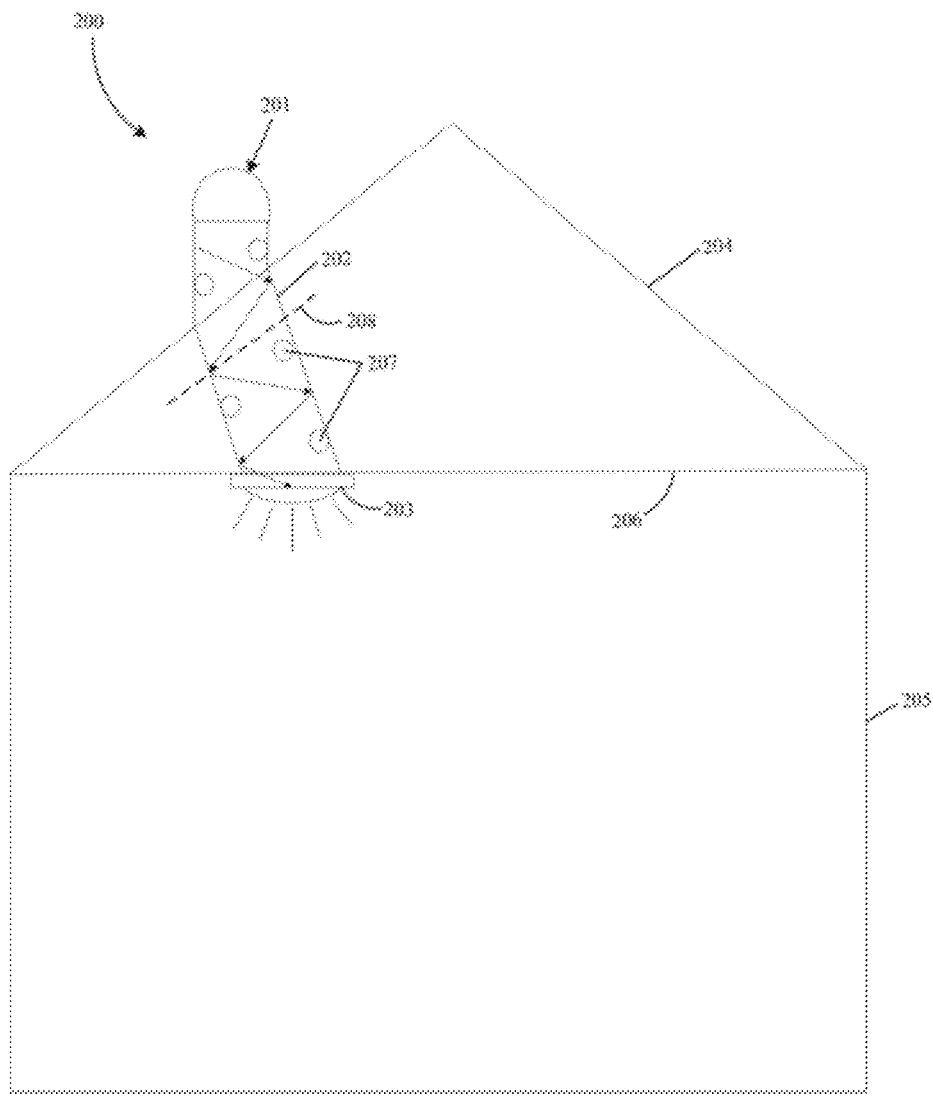
FIGS. 2A-2D depict various non-limiting embodiments of a lighting system in accordance with the present disclosure.

FIG. 2A illustrates one example of a lighting system 200 in accordance with the present disclosure. As shown, the lighting system 200 includes a solar-tube installed through the roofline 204 of a building 205. The solar-tube includes an inlet for capturing natural light, in this case dome 201. Dome 201 captures natural light, e.g., from the sun and/sky, and conveys it to an optical conduit 202. Similar to a traditional solar-tube, the optical conduit 202 includes highly reflective interior surfaces, which allow it to efficiently convey the captured natural light to a diffuser 203.

While the lighting system is shown as including a dome 201 capturing light, it should be understood that an inlet having any structure or mechanism for capturing natural light may be used. Non-limiting examples of such inlets include windows, mirror systems, solar concentrators, lenses, domes or a combination thereof.

While the optical conduit 202 is depicted in FIG. 2 as being angled, relative to the outlet of the dome 201 and the inlet of the diffuser 203, one of ordinary skill will understand that this configuration is exemplary only, and that the optical conduit 202 can be of any configuration suitable for delivering sunlight to the diffuser 203. For example, the optical conduit 102 may be straight, curvilinear, angled, or a combination thereof. The optical conduit 102 may also be configured in the form of a window, or skylight. In such instances, the optical conduit may be of any suitable shape or configuration, e.g., quadrilateral (square, rectangular, trapezoidal, etc.), triangular, oblong, etc. In some embodiments, the optical conduit is configured to convey the captured natural light to diffuser 203 with less than about 1% loss, such as less than about 0.5% loss, or even less than about 0.1% loss. Moreover, the solar tube may be configured to utilize one (as shown) or more than one (e.g., 2, 3, 4, etc.) optical conduits for each dome 201 and diffuser 203.

The diffuser 203 receives sunlight from the optical conduit 202, and distributes it into the interior of the building 205. In general, the diffuser 203 is configured to provide a desired distribution of natural light within an illuminated space. For example, the diffuser 203 may be configured as a convex dome, so as to provide even or substantially even distribution of the natural light received from the optical conduit 202. However, the shape and configuration of diffuser 203 may be altered to achieve a wide variety of optical distributions and/or effects. Moreover, while the diffuser 203 is shown in FIG. 2A mounted below the ceiling 206 of an interior space of the building 205, it should be understood that the diffuser 203 can be mounted in any manner, and positioned anywhere that delivery of natural light captured by the dome 201 is desired.

In addition to the aforementioned components, the lighting systems described herein include at least one artificial light source 207. As non-limiting examples of suitable artificial light sources that may be used in accordance with the present disclosure, mention is made multimode artificial light sources, and multimode artificial light sources in combinations with single mode artificial light sources.

As used herein, the term "multimode artificial light source" refers to any of a variety of radiation sources having at least two selectable colors and/or color temperatures. Such sources include, but are not limited to LED-based sources as defined below, incandescent sources (filament lamps, halogen lamps) with multiple selectable colors and/or color temperatures, fluorescent sources with multiple selectable colors and/or color temperatures (e.g., fluorescent lamps with two or more color temperatures), and high intensity discharge sources (e.g., sodium, mercury, and metal halide lamps) with multiple selectable colors and/or color temperatures. In some embodiments, the multimode light sources used herein are capable of exhibiting a wide range of colors and color temperatures, such as the colors in the red, green, blue (RGB) gamut and/or the red, green, blue, and yellow (RGBY) gamut.

As used herein, the terms, "light emitting diode" and "LED" are used interchangeably, and refer to any light emitting diode or other type of carrier injection/junction-based system that is capable of generating radiation in response to an electrical signal. Thus, the term LED includes, but is not limited to, various semiconductor-based structures that emit light in response to current, light emitting polymers, light emitting stripes, electro-luminescent strips, and the like.

In particular, the term LED refers to light emitting diodes of all types (including semi-conductor and organic light emitting diodes) that may be configured to generate light in all or various portions of one or more of the visible, ultraviolet, and UV spectrum. Non-limiting examples of suitable LEDS that may be used include various types of infrared LEDS, ultraviolet LEDS, red LEDS, green LEDS, blue LEDS, yellow LEDS, amber LEDS, orange LEDS, and white LEDS. Such LEDS may be configured to emit light over a broad spectrum (e.g., the entire visible light spectrum) or a narrow spectrum.

The LED light sources used in the present disclosure may be formed by one or a plurality of individual LEDS. For example, the LED light source may be configured to include a number of individual LEDS that emit different spectra but which, collectively, emit light that is of a desired color (e.g., white, red, blue, green, yellow, orange, amber, etc.) and/or color temperature. An LED may also be associated with a phosphor that is an integral part of the LED.

In some embodiments, the artificial light source 207 is a multimode light source that includes at least one red (R), green (G) and blue (B) LED, and optionally at least one yellow (Y) LED. The R, G, B, and optionally Y LEDS each emit light in individual regions of the visible spectrum but, collectively, enable the artificial light sources 207 to emit light of any color, including any or a subset of colors in the RGB and/or RGBY gamut. Alternatively or additionally, the lighting systems of the present disclosure may make use of so-called color tunable LEDS, i.e., individual LEDs with adjustable color temperature and optionally adjustable intensity. As a non-limiting example of such color tunable LEDS, mention is made of phosphor converting LEDS.

The multimode artificial light sources of the present disclosure may be supplemented with single mode artificial light sources, e.g., to increase intensity and/or color reproduction over a desired range of the spectrum. As used herein, the term, "single mode artificial light source" refers to a wide range of light sources that exhibit a single color and color temperature. Such sources include, but are not limited to, conventional incandescent, fluorescent, and high intensity discharge sources (e.g., lamps), as well as single mode LED sources (e.g., high intensity white LEDS that do not have an adjustable or selectable color and color temperature).

In some embodiments, the lighting systems described herein utilize a combination of multimode LED light sources with fluorescent lamps. For example, the multimode LED light sources described above can be combined with single mode fluorescent lamps, multimode fluorescent lamps, and/ or multiple single mode fluorescent lamps that have different color temperatures. In these embodiments, the fluorescent lamps can be dimmed/driven to provide light of a desired intensity, while the LED sources are driven to supply additional color emphasis/shift.

The single mode and multimode artificial sources may be capable of emitting light over a wide range of intensity (brightness) values. In some embodiments, the single mode sources and multimode sources used in the lighting systems described herein may, individually or collectively, emit light at an intensity of up to about 25,000 lux or more, where 1 lux=1 lumen per square meter. For example, such sources may, individually or collectively, exhibit an intensity ranging from greater that 0 to about 25,000 lux, such as about 1000 to about 20,000 lux, about 2500 to about 15000 lux, about 5000 to about 12500 lux, or even from about 8000 to about 12000 lux. In some the artificial light sources used in the present disclosure exhibit an intensity approximating that of natural light supplied by at least one solar-tube. In some embodiments, the intensity of the single and multimode artificial light sources can be actively changed, e.g., via dimming.

In some embodiments, at least one of the artificial light sources described herein is installed within at least one component of a solar-tube. For example, and as shown in FIG. 2A, artificial light sources 207 may be installed periodically along the interior of the optical conduit 202. Of course, the positioning of the artificial light sources 207 in FIG. 2 is exemplary only, and such sources may be positioned at any suitable location within the solar tube, including within the dome 201 and the diffuser 203. Moreover, if multiple artificial light sources 207 are used, they may be arranged in any manner within the solar-tube. For example, the artificial light sources 207 may be arranged in a geometric (circular, triangular, square, rectangular, etc.) or irregular shape about a circumference of an interior of any of the dome 201, the optical conduit 202, and/or the diffuser 203. In one none limiting example, the artificial light source is arranged in the diffuser 203 via optical guide plate. Alternatively or additionally, the artificial light sources 207 may be disposed in a random, patterned, and/or non-random, non-patterned fashion.

In some embodiments, the artificial light sources are disposed internally or externally of a solar-tube, and in such a manner that light emitted from the artificial light sources mixes with the natural light supplied by the solar-tube. This concept is illustrated generally in FIG. 2C, wherein the artificial light source 207 (in this case a color tunable LED source) is disposed adjacent to a source of daylight, e.g., a solar tube containing a dome 201, an optical conduit 202, and a diffuser 203. As shown, light from the artificial light source 207 and natural light supplied by the source of daylight mix in a mixing chamber 215 prior to being emitted into an illuminated space, e.g., an interior space of a building (not shown).

By mixing light supplied by the artificial and natural light sources in this way, light from all sources is mixed (e.g., in a component of the solar-tube itself) prior to leaving a common outlet, such as a diffuser 203. This can give the impression that all of the light radiating from the outlet originated from a single source. It can also eliminate or address the perceptible color difference problem discussed above.

As described later, some embodiments of the present disclosure utilize artificial light sources that are mounted outside of the solar-tube and any mixing chamber. While such configurations may forego the "single source" benefit described above, they can provide other useful features and/or design flexibility.

The lighting systems of the present disclosure may also include one or more shutters 208, which operate to control the intensity of the natural light admitted by the solar-tube. The shutters 208 may be manually or electromechanically actuated, thereby permitting manual, electronic, and automatic control over the intensity of the natural light emitted by the solar tube. In some embodiments, the shutter 208 is electromechanically actuated, and is responsive to control signals emitted by a control unit that may also be included in the lighting system, as described below.

Shutter 208 can be configured to alter the intensity of the natural light admitted by a solar tube by preventing all or a portion of the natural light from passing to the diffuser 203. In some embodiments, shutter 208 can block up to about 50%, such as up to about 75%, or even up to about 99% of the natural light captured by the dome 201 from entering a space to be illuminated. The shutter 208 may also include fine motor control, allowing for blocking of light in small (e.g., 1%, 5%, etc.) increments within any of the foregoing ranges.

In conjunction with other aspects of the present disclosure, the shutter 208 can assist the lighting systems described herein to "override" or supplement the natural light captured by dome 201, e.g., by limiting the contribution of the natural light to the overall light supplied by the lighting system as described below.

When the lighting systems described herein are installed in a location that includes at least one window, they may further include a manually or automatically actuated window shutter. This concept is reflected in FIGS. 2B and 2D, wherein a daylight sensor 209 (later described) is mounted in window 213. Window shutter 214 is mounted in window 213, and serves to control the amount and intensity of natural light entering the building through the window 213, e.g., in response to control signals transmitted from a control unit (later described).

Figure 2B:
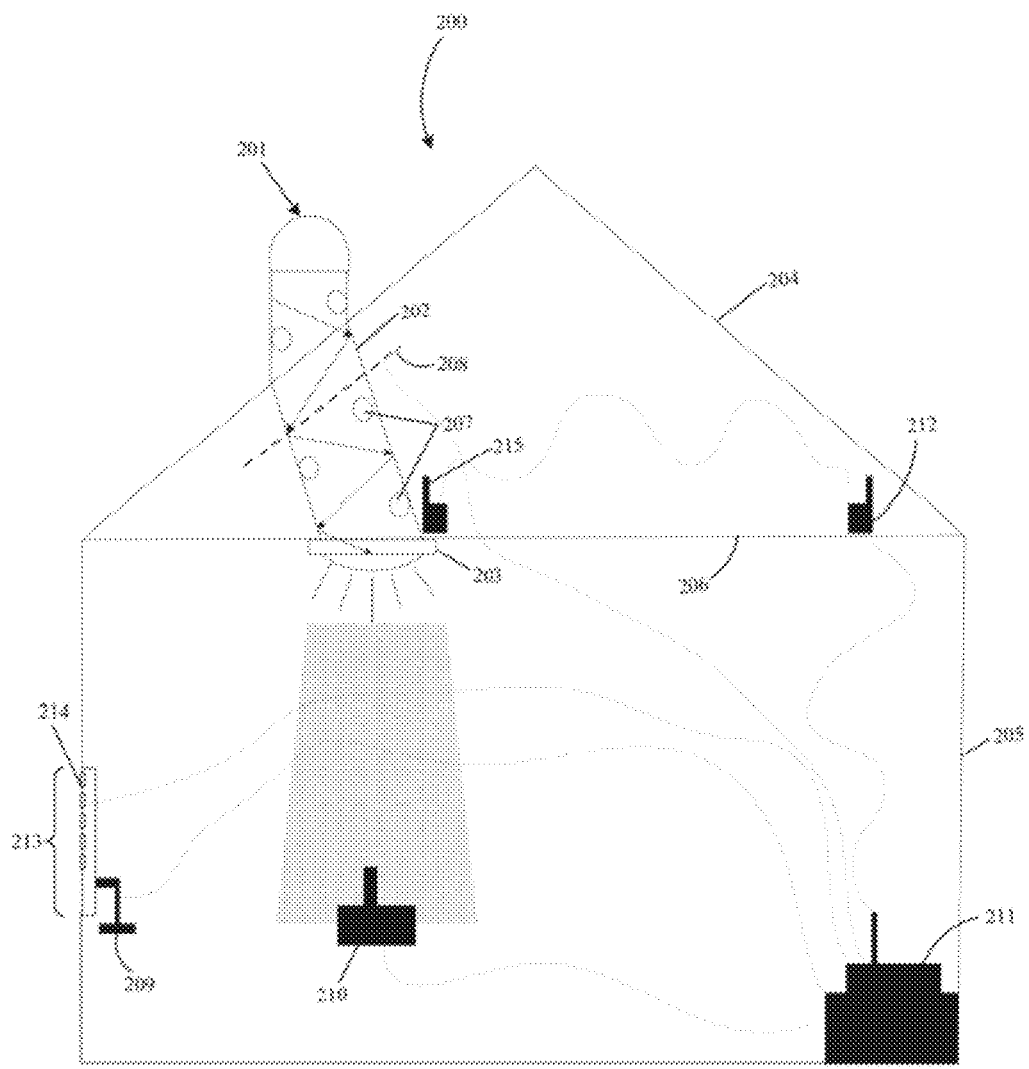
Figure 2C:
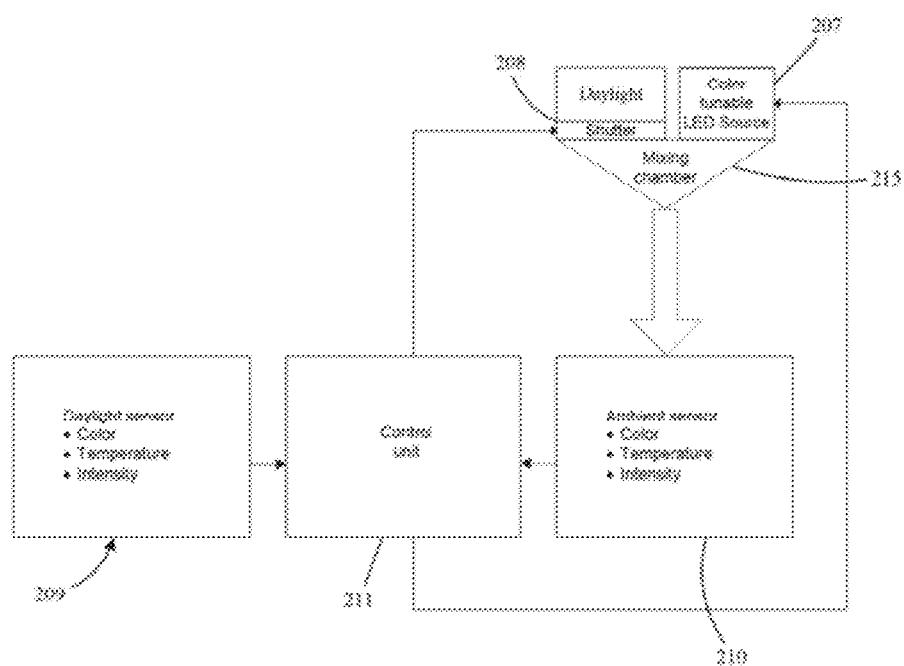

As further shown in FIG. 2B, the lighting systems described herein may include a control unit 211 that is communicating with the artificial light sources 207 and/or the shutter 208. In operation, the control unit 211 outputs control signals to the artificial light sources 207 and, optionally, the shutter 208. Based on the content of those control signals, the artificial light sources 207 emit light of a desired color, color temperature and, optionally, intensity. In addition, the shutter 208 actuates to adjust the intensity of the natural light provided by the solar tube. In this way, control unit 211 provides "instructions" to the shutter 208 and the artificial light sources 207, so as to achieve a desired lighting profile.

As used herein, the term "lighting profile" refers to the spectral characteristics (color, temperature, intensity, etc.) of light provided by a light source or system. Lighting profiles may be natural (e.g., recorded or measured from a natural environment such as the outdoors), or synthetic (e.g., manually developed, or measured from an unnatural source such as a photograph). Data making up a lighting profile may be generated from active and optionally real-time data measurements of a natural environment, manual inputs, the measurement of a sample of a lighting environment (e.g., a photograph, a video image, etc.), or a combination thereof. For example, a "natural lighting profile may be generated by measuring or recording desirable natural light conditions with a daylight sensor, such as the lighting conditions encountered on a clear sunny day, or at a famous location such as a popular beach. On the other hand, "artificial" lighting profiles may be manually created, determined by a lighting algorithm, or conducting a spectral analysis of a sample of a lighting environment, such as a photograph.

The control unit 211 may include a memory that can, for example, store one or more lighting profiles in machine readable format. In this way, the control units described herein allow for the automatic or manual selection of desirable lighting profiles that can supplement or override the natural light supplied by the solar-tube or another source of natural light.

The control unit 211 may further include a processor. The processor can operate to analyze and interpret environmental signals received from environmental sensors, such as the daylight sensor(s) or camera 209 and ambient sensor(s) 210 later described. Based on that analysis, the control unit can output control signals to the artificial light sources 207 and/or the shutter 208. Such control signals can be in any desired format, including but not limited to the DMX and DALI protocols commonly used in lighting systems.

As mentioned above, and as illustrated in FIG. 2B, the lighting systems described herein can further include at least one environmental sensor, such as a daylight sensor 209. The daylight sensor 209 may be placed at any desired location where monitoring of the color characteristics of natural light is desired. For example, the daylight sensor 209 may be placed in window of a building, where it can detect and monitor the color of natural light from the viewing angle of that window.

In operation, the daylight sensor 209 monitors spectral characteristics of an external environment (e.g., the outdoors), and transmits one or more environmental signals to the control unit 211 for analysis and interpretation. For example, the daylight sensor may operate to monitor color characteristics (e.g., wavelength (color), color temperature, and intensity) present in an outdoor environment. In some embodiments, multiple daylight sensors are used and are placed at different locations throughout a building. Each daylight sensor operates to monitor the color characteristics of the daylight from its respective location, and to generate environmental signals for transmission to control unit 211.

Based on the information contained in the environmental signals produced by the daylight sensor 209, control unit 211 outputs control signals to the artificial light sources 207 (and/or shutter 208), and alters the color and intensity of the light produced by the artificial light sources 207 to account for undesirable characteristics in the natural light. In some embodiments, the color and/or intensity of the light produced by the artificial light sources 207 is adjusted by control unit 211 so as to substantially mimic or supplement the color and/or intensity of natural light. In cases where the artificial light supplements the natural light, it may "fill in" or override gaps and/or undesirable variations in the spectrum of the natural light so as to achieve light of desired quality, color, and/or spectral characteristics.

Figure 3A:
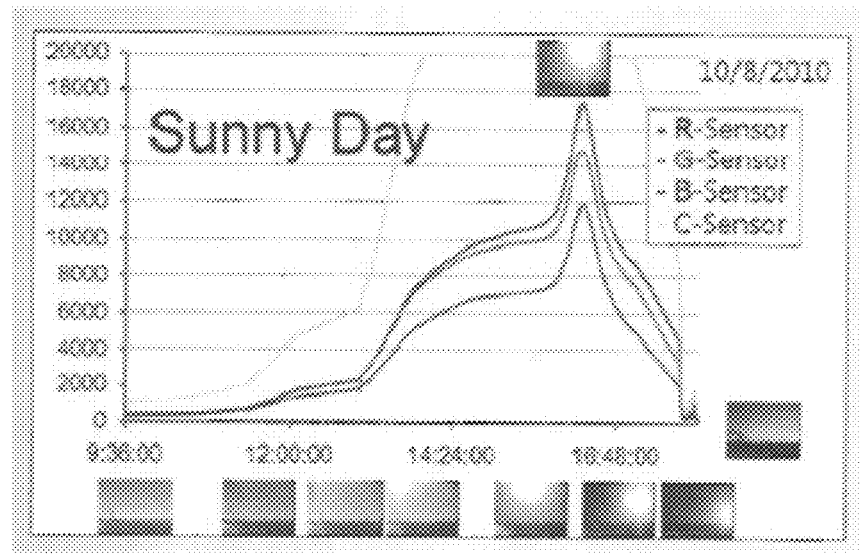
FIGS. 3A and 3B provide exemplary red, green, blue, and clear sensor data measured by at least one daylight sensor during a sunny (FIG. 3A) and cloudy (FIG. 3B) day.
Figure 3B:
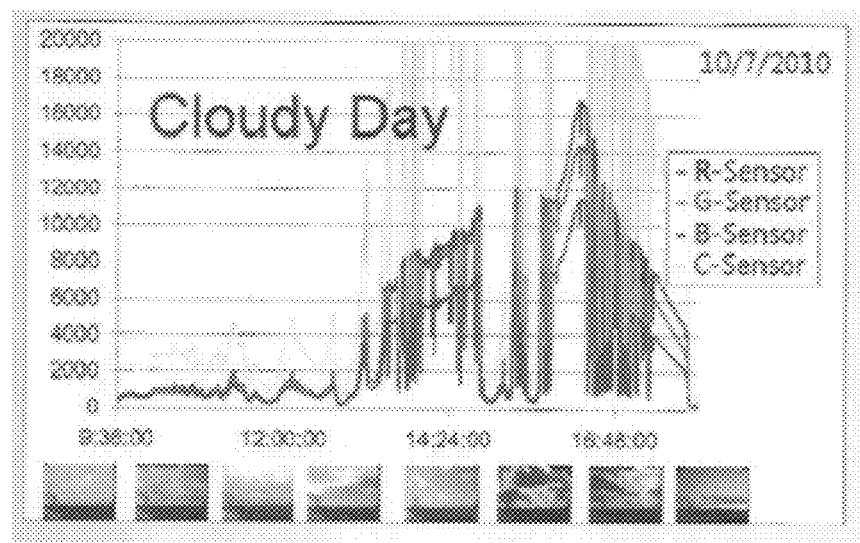

To illustrate this concept, reference is made to FIGS. 3A and 3B, which plot Red (R), Green (G), Blue (B) and clear (C) light intensity vs. time of day as measured by a daylight sensor during a sunny (FIG. 3A) and a cloudy (FIG. 3B) day. As shown in FIG. 3B, the RGBC data corresponding to a cloudy day can exhibit significant and seemingly random variation, as compared with the RGBC data corresponding to a sunny day. During the cloudy day, the natural light supplied by a solar tube would be in accordance with the data shown in FIG. 3B, which could lead to undesirable lighting conditions in an interior space.

In some embodiments of the present disclosure, the control unit 211 of the present disclosure can address this undesirable variability by comparing the data acquired by the daylight sensor to one or more lighting profiles. Based on this comparison, control unit 211 can output control signals that cause artificial lighting units to compensate for the undesirable variability in the monitored natural light. Using FIGS. 3A and 3B as an example, the control until 211 can perform a comparison of the RGBC sensor data measured during the cloudy day (FIG. 3B) with the desirable RGBC sensor data measured during a sunny day (FIG. 3A). Based on this comparison, the control unit 211 can instruct the artificial lighting units 207 to output light of a color and intensity sufficient to account for the variability in the rainy day RGBC data.

For example, if the RGBC data showed that relatively little blue light was emitted during a cloudy day, relative to a sunny day, the control unit 211 can instruct the artificial lighting units 207 to emit blue light of a corresponding color (wavelength) and intensity to "normalize" the cloudy day RGBC data to the sunny day RGBC data. In this way, an artificial light source as described above can be driven by a local sensor, thus allowing dynamic changes of the lighting conditions supplied by the lighting systems described herein.

As is understood in the art, the data provided by an environmental sensor such as a daylight sensor does not always correlate to the emitted color and intensity level of an artificial light source, such as an LED source. Thus, for example, if the environmental signals produced by daylight sensor 209 provide RGB and intensity sensor data to the control unit 211, a transformation of such data into RGB and intensity levels coinciding with the artificial light sources 207 may be necessary. Accordingly, in instances where LED sources are used in the artificial light sources 207, the control unit 211 can use an appropriate algorithm to transform the sensor data into the necessary LED color and intensity values needed to achieve a desired lighting profile.

The control unit 211 can regulate the light output of artificial light sources 207, the operation of shutter 208, and the operation of window shutter 213 (when used), through a wired or wireless connection. For example, the control unit 211 may communicate wirelessly with receivers 215 on the artificial light sources 207, shutter 208, and window shutter 213, either directly or through one or more wireless repeaters 212. Such wireless communication may occur using the 802.11 wireless standard, the 802.15.4 wireless standard, or another suitable wireless communication protocol.

In some embodiments, each artificial light source 207 is individually addressable by the control unit 211. As a result, the control unit 211 can control the output of each artificial light source 207 individually, even when a large number of artificial light sources are employed. Moreover, control unit 211 can alter the output of artificial light sources installed in one location independently of artificial light sources installed at another location.

In addition to the aforementioned daylight sensor(s) 209, the lighting systems of the present disclosure may further include at least one ambient light sensor 210. Like the daylight sensor 209, the ambient sensor 210 functions to monitor color and other environmental characteristics, and to transmit environmental signals to control unit 211. However, instead of monitoring an external environment, the ambient sensor 210 is configured to monitor the lighting conditions (e.g., color, color temperature, intensity, etc.) of an area illuminated by the lighting systems described herein, and output environmental signals containing that information to the control unit 211. Those environmental signals can be used by the control system 211 to fine tune the output of the artificial light sources 207, e.g., by comparing the color and intensity characteristics of light outputted by the lighting system against a lighting profile stored in the memory of the control unit 211.

In addition, ambient sensors 210 can permit more flexible positioning of the artificial light sources 207. For example, the artificial light sources may be mounted external to a solar tube, and without the use of a previously described mixing chamber 215. In some embodiments, the artificial light sources are placed a significant distance from the solar tube, such as from greater than 0 to about 100 feet or more.

As noted above, the placement of artificial light sources outside of a solar tube can result in perceptible color variations between the light supplied by the artificial light source and the natural light supplied by the solar tube. While such placement is envisioned by the present disclosure, it may be desirable to control the degree of color difference between the artificial light sources and natural light sources described herein. Accordingly, in some embodiments of the present disclosure, the ambient sensor(s) 210 and control unit 211 cooperatively function to monitor and adjust the color, color temperature, and/or intensity of the light outputted by the artificial light sources, relative to the color and intensity of the light outputted from a natural light source, such as the solar tube. In this way, the lighting systems described herein can illuminate an area with a lighting profile that is substantially uniform, or which incorporates regions illuminated by light of varied color, color temperature, and/or intensity.

Figure 2D:
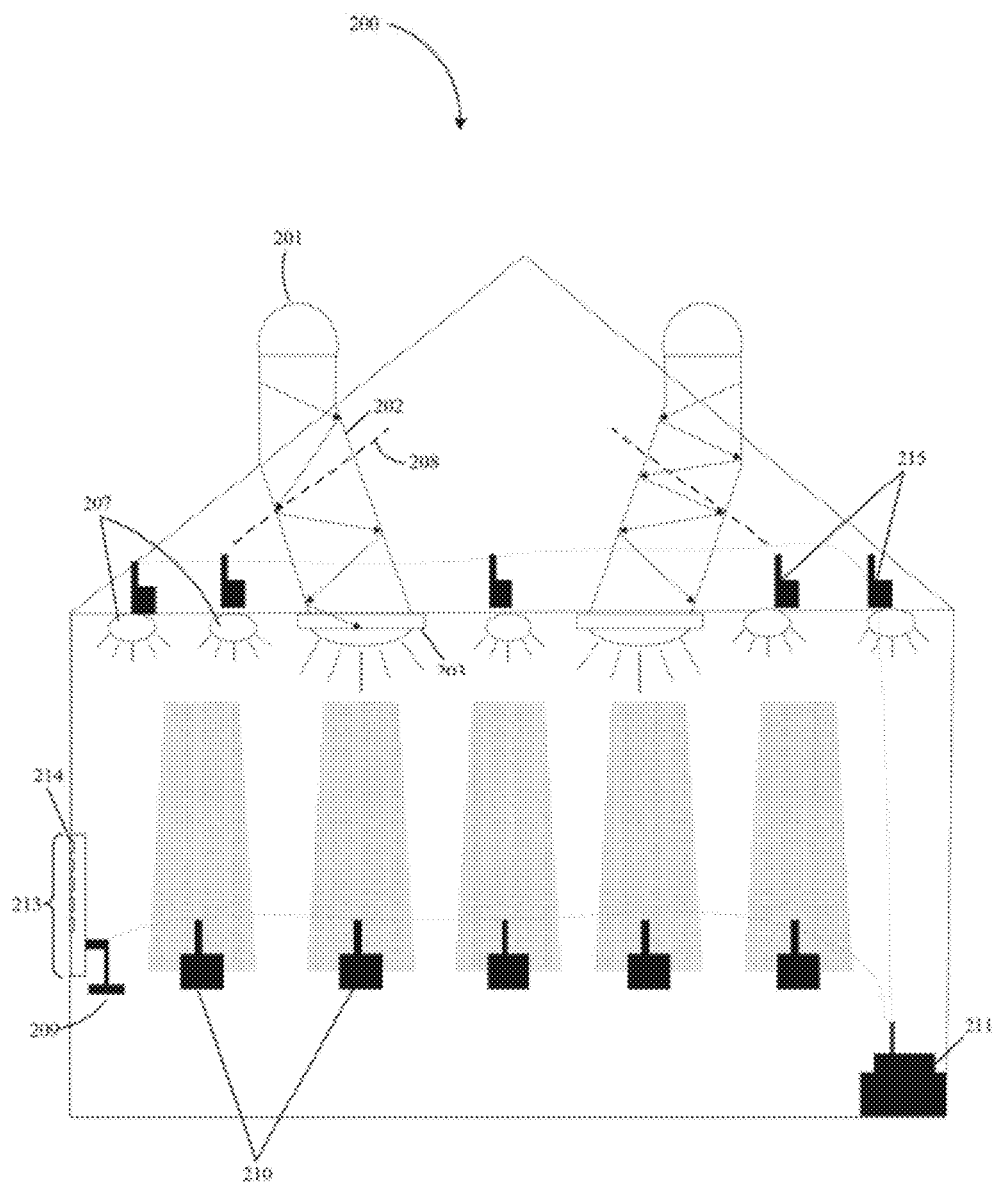

FIG. 2D illustrates one non-limiting example of this concept. As shown, lighting system 200 includes multiple solar tubes having a dome 201, an optical conduit 202, a diffuser 203, and a shutter 208. Artificial light sources 207, e.g., tunable LED sources, are mounted external to the solar tubes, such as to a ceiling 206 of an internal space of a building 205. Daylight sensor 209 measures the color and intensity information outside of a window 213, and transmits environmental signals containing such information to control unit 211. A plurality of ambient sensors 210 are disposed around the interior space of building 205. The plurality of ambient sensors 210 measure the color, color temperature, and intensity of the light present in the interior space of the building 205, the light emitted by the artificial light sources 207, and/or the light emitted by sources of natural light, e.g., the solar tubes and/or window 213 solar tube(s). In some embodiments, the ambient sensors are configured to measure other environmental factors such as temperature and/or humidity, either alone or in combination with the color, color temperature and intensity information described above. Such temperature and humidity data could be inputted, for example, into an HVAC control, thereby permitting control over the lighting, temperature and humidity of a controlled environment.

The ambient sensors 209 communicate the aforementioned data in the form of environmental signals to the control unit 211. The control unit 211 analyzes the environmental signals provided by the daylight sensor 209 and the plurality of ambient sensors 210, and outputs control signals wirelessly to the shutter 208 and the plurality of artificial light sources, via receivers 215 and optional wireless repeaters 212. In response to those control signals, the shutters 208 actuate to adjust the intensity of the natural light supplied by the solar tubes to the interior space of building 205. In addition, the color, color temperature, and/or intensity of each of the artificial light sources 207 may be adjusted. In this way, control unit 211 is capable of actively adjusting the color, temperature, quality, and intensity of the light supplied by the lighting system 200.

Based on the above description, it should be understood that the components of the lighting systems described herein may be located in a variety of different locations. Thus, for example, the sensors, solar tubes, and artificial light sources may be disposed at different locations within the same room or building. Regardless of their positioning, such components may be individually addressable and controllable by the control unit 211. Moreover, control unit 211 may be configured with the capability to sending different control signals to various parts of the lighting system (e.g., different artificial light sources, shutters, etc). As a result, control unit 211 can issue control signals that cause differing light output and shutter control at one point in the system, relative to another point in the system. As a result, control system 211 can provide a significant flexibility to lighting designers with respect to altering the overall lighting environment of an interior space. Indeed, such systems can enable a lighting designer to design lighting environments that utilize light of a substantially uniform color and/or intensity, or to utilize light of varying color and/or intensity depending on location within the building, time of day, or other factors.

Figure 4:
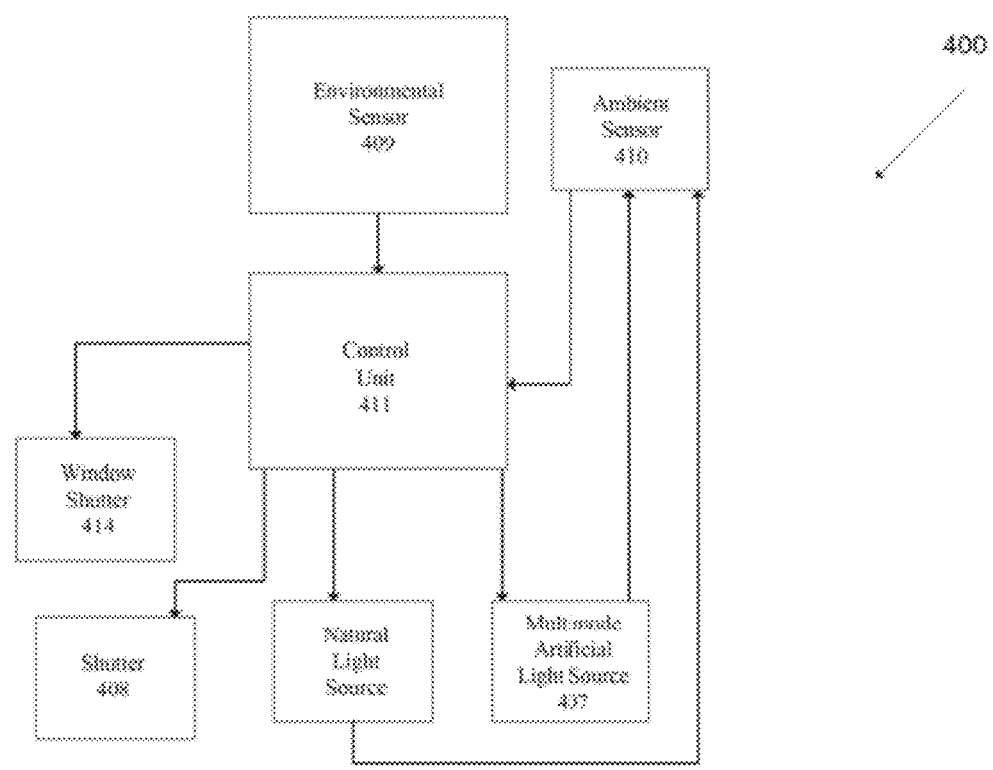
FIG. 4 depicts a non-limiting embodiments of a lighting system in accordance with the present disclosure.

Another aspect of the present disclosure relates to lighting methods that utilize the lighting systems described herein. As an example of such a method, reference is made to FIG. 4, wherein arrows are utilized to illustrate the flow of information and/or signals between the components of an exemplary lighting system 400 in accordance with the present disclosure. As shown, the methods described herein include providing a lighting system 400 that includes at least one natural light source (e.g., a solar tube), at least one artificial light source 407 (e.g., a multimode artificial light source), at least one environmental sensor 409, and at least one control unit 411. The natural light source may also include at least one shutter 408 (not shown). At least one ambient sensor 409 and at least one window shutter 410 may also be included.

In such methods, the environmental sensor (e.g., a daylight sensor) measures at least one environmental characteristic, such as the color, color temperature, and/or intensity of an outdoor environment. The environmental sensor 409 outputs environmental signals containing information regarding the at least one environmental characteristic to the control system 411. In systems that utilize an ambient sensor 410, the ambient sensor 410 measures, independently of environmental sensor 409, environmental characteristics (e.g., color, color temperature, and/or intensity) of an environment to be illuminated by the lighting system 400, as well as the light outputted by the natural light source and artificial light source 407. Based on those measurements, the ambient sensor 410 outputs environmental signals to control system 411.

Upon receiving environmental signals from the environmental sensor 409 and, optionally, the ambient sensor 410, the control system 411 outputs at least one control signal to the artificial light sources 407 and, optionally, the shutter 408 and window shutter 414. In response to these control signals, the artificial light sources 407 output light of a desired color, color temperature, and/or intensity. In addition, the shutter 408 and/or the window shutter 414 may actuate to admit more or less natural light. In this way, the control system 411 can independently control the individual elements of lighting system 400, so as to achieve a desired lighting profile in an illuminated space.

The lighting systems and methods of the present disclosure have potential for substantial energy savings by enabling greater usage of natural light. In addition, such systems are capable of replicating current daylight conditions, and overriding current daylight conditions with a desired optional lighting profile, thus providing numerous choices to an end user.

Figure 5:
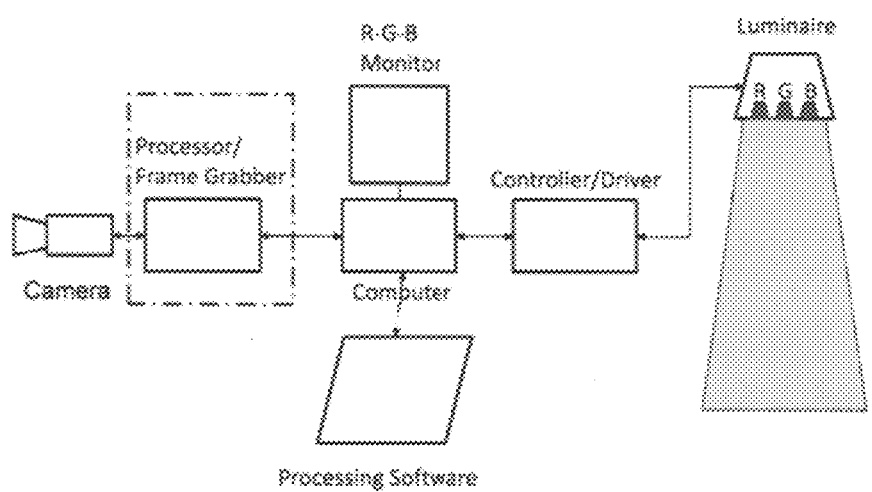
FIG. 5 depicts another non-limiting embodiments of a lighting system in accordance with the present disclosure.

Another aspect of the present disclosure relates to lighting devices and methods that utilize the lighting systems described herein. As an example of such a method and system, reference is made to FIG. 5, wherein arrows are utilized to illustrate the flow of information and/or signals between the components of an exemplary lighting system 500 in accordance with the present disclosure. As shown, the methods described herein include providing a lighting system 500 that includes at least sensor or camera or source of color information, at least one artificial light source (e.g., a multimode artificial light source), at least one ambient sensor/monitor, and at least one control unit. A natural light source, as previously described, may also be include but is not required.

The camera, image sensor, or source of color information, as used herein, refers to any imaging device, for example, but not limited to, video cameras, a webcams, a Digital Single-Lens Reflex Camera (DSLR), mobile/smart phone camera, gaming devices, R-G-B image sensor, or other imaging device that acquires image information. The cameras may be connected to a computer or process by wired or wireless using a variety of communication and network protocols. The information may be communicated as images and/or streaming video frames. Video signals may require a "frame grabber" process to provide an image or individual frame for analysis.

The computer may utilize software and/or hardware to convert the color/intensity information from the images acquired by the cameras into, for example, an R-G-B bitmap format. This format can be used to drive the luminaire or light fixtures with R-G-B inputs. R-G-B is a convenient color model for computer graphics because the human visual system works in a way that is similar—though not quite identical—to an R-G-B color space. The R-G-B color model is an additive color model in which red, green, and blue light are added together in various ways to reproduce a broad array of colors. The name of the model comes from the initials of the three additive primary colors, red, green, and blue.

The most commonly used R-G-B color spaces are sRGB and Adobe RGB (which has a significantly larger gamut). sRGB is considered the most commonly used R-G-B color space, particularly in consumer grade digital cameras, HD video cameras, and computer monitors. HDTVs use a similar space, sharing the sRGB primaries, commonly called Rec. 709. sRGB is considered adequate for most consumer applications. Having all devices use the same color space is convenient in that an image does not need to be converted from one color space to another before being displayed.

The computer may use camera software algorithms that are already optimized for good color replication of the imaged scene, this information can be advantageously utilized for providing color/intensity control info for R-G-B channel type luminaires. Additional advantages of current camera algorithms may be derived from the reduced dynamic range (8-bit equal to 255 intensity values for each color channel) the cameras have to operate in to be compatible with current computer (R-G-B) monitor systems. These advantages are not limited to 8-bit and may provide advantages for 16-bit or higher imaging devices.

To compensate for the much higher range of real daylight intensities, the algorithms may adjust the exposure time or aperture opening of the camera sensors dynamically, thus providing already the necessary limited value range of R-G-B values for typical current digital luminaire driving electronics.

The computer feeds the color/intensity information to the controller/driver. The controller causes the luminaire to emit the desired color and intensity recreating the color and intensity of the image. An additional sensor (not shown in FIG. 5) can be placed to determine the current emission of light within the area being illuminated, as previously described. The luminaire can then be used to supplement the current emission to replicate the desired lighting profile in the image within the area being illuminated.

Figure 6:
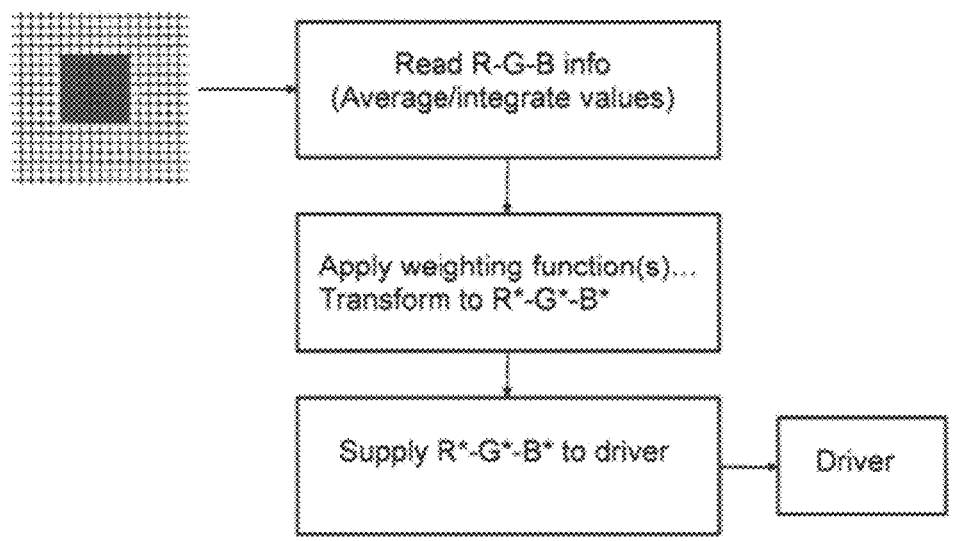
FIG. 6 depicts another non-limiting embodiments of a color analysis method in accordance with the present disclosure.

As shown in FIG. 6, processing algorithms 600 of the computer or camera may extract color/intensity information from the streaming video frames or saved images. These R-G-B values may not necessarily lead to the same R-G-B output from the luminaire. The output of the luminaire R'-G'-B' may usually need to be adjusted to create the same R-G-B values as the images. Often this "adjustment" can be done by mixing the luminaire colors in slightly different proportions. This mixing can be described by a transformation matrix (dependent on luminaire):

$$\begin{pmatrix} R \\ G \\ B \end{pmatrix} = \begin{pmatrix} M11 & M12 & M13 \\ M21 & M22 & M23 \\ M31 & M32 & M33 \end{pmatrix} * \begin{pmatrix} R' \\ G' \\ B' \end{pmatrix}$$

The matrix elements M11 . . . M33 may have to be determined by measurements; this procedure may be referred to as "calibration". The R'-G'-B' values that the driver needs to supply to the luminaire are then given by $$\begin{pmatrix} R' \\ G' \\ B' \end{pmatrix} = \begin{pmatrix} M11 & M12 & M13 \\ M21 & M22 & M23 \\ M31 & M32 & M33 \end{pmatrix}^{-1} * \begin{pmatrix} R \\ G \\ B \end{pmatrix}$$

Advantages of this matrix description may lie in the fact that it is easily implemented into micro-processor algorithm.

Figure 7A:
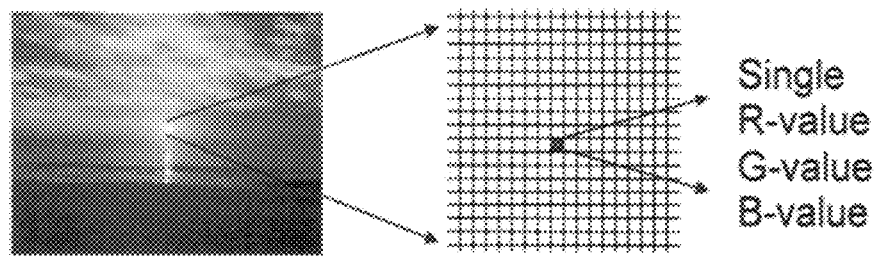
FIGS. 7A, 7B, and 7C depict another non-limiting embodiments of a color analysis method by selective regional analysis of the image in accordance with the present disclosure.
Figure 7B:
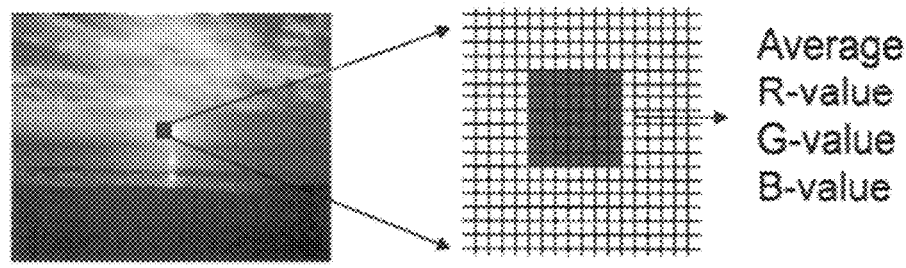
Figure 7C:
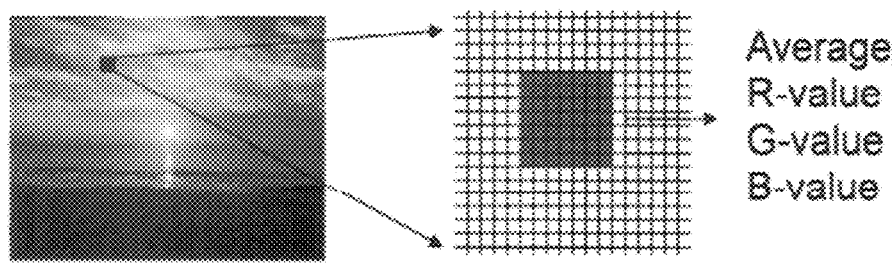

Embodiments of the invention can also include a variety of processing algorithms that selective define the color analysis based on regions of the image. Exemplary modes may include but are not limited to the following embodiments. In one embodiment the method uses only a center pixel for color analysis as shown in FIG. 7A. In another embodiment, an integrated central area is used for color analysis as shown in FIG. 7B. In another embodiment, the user may select an area, for example, by positioning a cursor as shown in FIG. 7C. The size of the region can be selected based on the intended application. In another example the whole image may be used or select portion, for example, the boundary or boarder of the image may be used for color analysis. In addition, a weighting function can be applied to color/intensity values; e.g. the boundary areas of an image can be weighted higher than the center. This can lead to a smoother transition from image to a possible background illumination. In other embodiments, an averaging over several images could be applied. This can lead to smoother transitions in the time domain.

In another embodiment, a weighting function can be applied to color/intensity values in the time domain. Videos with frame rates of typically 30/sec in the US (NTSC) or 25/sec in Europe (PAL) can be used to update the color/intensity information, it might be desirable to reduce the update rate. The decreased frame rate reduces the demand on network and electronic driver requirements. In fact, in a daylight application it might be desirable to update the luminaire output at a much reduced rate (e.g. once every five minutes). Embodiments may minimize updates of the luminaire in view of the limitation of human perception.

Exemplary embodiments can be used to recreate desirable locations and/or weather conditions, for example, an individual traveling may desire to have a lighting profile of the current conditions at home or at locations of loved ones. In another example, an individual may desire to have a lighting profile of a Caribbean sunset on a clear evening.

In other application, embodiment may be used in combinations with the display of an image on a monitor. In one example, a slideshow of images may be supplemented with the emission of the replicated lighting profile obtained from analyzing each image of the slideshow. In another example, a movie may be supplemented with the emission of the replicated lighting profile obtained from movie. In this example indoor, outdoor, evening, noontime, and/or morning scenes may be enhanced by emission of the lighting profile during the scene. In these examples, the image may be analyzed before being displayed or a camera may be directed to the monitor displaying the image or video. As previously discussed the process may examine the boarders of the image or specified regions of the image to obtain the required information. In the scene replicating example, the process may use a known set of values to provide a set emission for a scene, for example, if a range of values may indicate, for example, an indoor scene or a sunny outdoor scene.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A lighting system, comprising:
   at least one multimode artificial ambient light source;
      at least one control unit coupled to said at least one artificial ambient light source and configured to output at least one control signal to said at least one artificial ambient light source wherein said at least one multimode artificial ambient light source is configured to output light of varying color and color temperature in response to said at least one control signal; and
      one remote image sensor coupled to said at least one control unit, wherein the remote sensor is configured to detect at least one color and intensity characteristic and an output signal to said at least one control unit, based on said color and intensity characteristic detected wherein the remote image sensor utilizes a weighted border region and center region of the image detected.

2. The lighting system of claim 1, wherein the remote image sensor utilizes only one pixel for aid color and intensity characteristic.

3. The lighting system of claim 1, wherein the remote image sensor utilizes a region of an image detected smaller than the area of the image detected.

4. The lighting system of claim 1, wherein the remote image sensor utilizes only a border region of an image detected smaller than the area of the image detected.

5. The lighting system of claim 1, further comprising a monitor wherein the complete image is displayed on the monitor.

6. The lighting system of claim 1, wherein the remote image sensor utilizes a frame grabber to provide an image to detect at least one color and intensity characteristic by the image remote sensor.

7. The lighting system of claim 1, wherein the remote image sensor converts the color and intensity characteristic into the output signal with an R-G-B bitmap format.

8. The lighting system of claim 1, further comprises an additional sensor coupled to said at least one control unit, wherein the additional sensor is configured to detect at least one color and intensity characteristic of current lighting conditions and wherein the control unit compensates the control signal for current lighting conditions.

9. The lighting system of claim 8, further comprising a mixing chamber configured to receive light from said natural light source and light from said at least one multimode artificial ambient light source.

10. The lighting system of claim 1, wherein said at least one multimode artificial ambient light source comprises a plurality of light emitting diodes (LEDS), wherein each of said plurality of LEDS is individually addressable and controllable by said at least one control unit.

11. The lighting system of claim 1, wherein said at least one multimode artificial ambient light source is disposed within at least one solar tube.

12. A lighting method, comprising:
   detecting at least one color and intensity characteristic and producing an output signal to at least one control unit based on said color and intensity characteristic with a remote image sensor wherein the remote image sensor utilizes a region of an image detected smaller than the area of the image detected;
   outputting at least one control signal to at least one artificial ambient light source by said at least one control unit; and
   outputting light of varying color and color temperature by at least one multimode artificial ambient light source in response to said at least one control signal.

13. The lighting method of claim 12, wherein the remote image sensor utilizes only one pixel for aid color and intensity characteristic.

14. The lighting method of claim 12, further comprising: displaying the image on a display.

15. The lighting method of claim 12, wherein the remote image sensor utilizes a frame grabber to provide an image to detect at least one color and intensity characteristic by the image remote sensor.

16. The lighting method of claim 12, wherein the remote image sensor converts the color and intensity characteristic into the output signal with an R-G-B bitmap format.

17. The lighting method of claim 12, further comprises an additional sensor coupled to said at least one control unit, wherein the additional sensor is configured to detect at least one color and intensity characteristic of current lighting conditions and wherein the control unit compensates the control signal for current lighting conditions.

18. The lighting method of claim 12, further comprising a mixing chamber configured to receive light from said natural light source and light from said at least one multimode artificial ambient light source.

19. The lighting method of claim 12, wherein said at least one multimode ambient artificial light source comprises a plurality of light emitting diodes (LEDS), wherein each of said plurality of LEDS is individually addressable and controllable by said at least one control unit.

20. A lighting system, comprising:
   at least one multimode artificial ambient light source;

at least one control unit coupled to said at least one artificial ambient light source and configured to output at least one control signal to said at least one artificial ambient light source wherein said at least one multimode artificial ambient light source is configured to output light of varying color and color temperature in response to said at least one control signal;

one remote image sensor coupled to said at least one control unit, wherein the remote sensor is configured to detect at least one color and intensity characteristic and an output signal to said at least one control unit, based on said color and intensity characteristic detected wherein the remote image sensor utilizes a weighted border region and center region of the image detected; and a monitor displaying the image wherein said ambient light source provides lighting in a room in which the monitor is displaying the image.

* * * * *